United States Patent
Förster

(10) Patent No.: US 7,523,817 B2
(45) Date of Patent: Apr. 28, 2009

(54) TORSIONAL VIBRATION DAMPER

(75) Inventor: Andreas Förster, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 454 days.

(21) Appl. No.: 11/139,793

(22) Filed: May 26, 2005

(65) Prior Publication Data

US 2005/0263360 A1    Dec. 1, 2005

(30) Foreign Application Priority Data

May 27, 2004  (DE) ............... 10 2004 026 043

(51) Int. Cl.
F16F 9/14    (2006.01)
(52) U.S. Cl. ................... 188/308; 188/296
(58) Field of Classification Search ............ 188/306, 188/308, 307, 309, 296
See application file for complete search history.

(56) References Cited

U.S. PATENT DOCUMENTS

| | | | |
|---|---|---|---|
| 2,096,468 A | | 10/1937 | Peo |
| 2,722,289 A | * | 11/1955 | Girard ............... 188/306 |
| 2,853,159 A | | 9/1958 | Kuhn, Jr. |
| 3,750,855 A | * | 8/1973 | Peddinghaus ........... 188/269 |
| 4,578,082 A | | 3/1986 | Chen |
| 4,872,537 A | * | 10/1989 | Warner ............... 188/282.9 |
| 5,810,129 A | * | 9/1998 | Hanawa et al. ........... 188/308 |
| 6,082,507 A | | 7/2000 | Förster |
| 6,098,765 A | | 8/2000 | Kato et al. |
| 6,955,249 B2 | * | 10/2005 | Biasiotto et al. ........ 188/267.1 |
| 7,191,877 B2 | * | 3/2007 | Norgaard et al. ........... 188/274 |
| 2004/0226790 A1 | | 11/2004 | Yoshimoto |

FOREIGN PATENT DOCUMENTS

| | | |
|---|---|---|
| DE | 28 25 957 | 11/1982 |
| DE | 696 27 605 | 1/2004 |
| EP | 0 769 636 | 4/2003 |
| GB | 2 001 731 | 2/1979 |

OTHER PUBLICATIONS

European Search Report dated Aug. 26, 2005, issued for European Patent Application No. 05 01 0418.

* cited by examiner

*Primary Examiner*—Bradley T King
(74) *Attorney, Agent, or Firm*—Cohen Pontani Lieberman & Pavane LLP

(57) ABSTRACT

A torsional vibration damper having a stator and a rotor provided with stator vanes and rotor wanes, respectively, which are arranged so as to form a plurality of work chambers fillable with damping medium and alternately changing their volumes during oscillation of the rotor. A damping device is provided in the rotor and has a compensation space in flow communication with the work chambers. The damping device has a throttle point configured so as to allow the compensation space to be pressurized by a relatively low pressure.

9 Claims, 3 Drawing Sheets

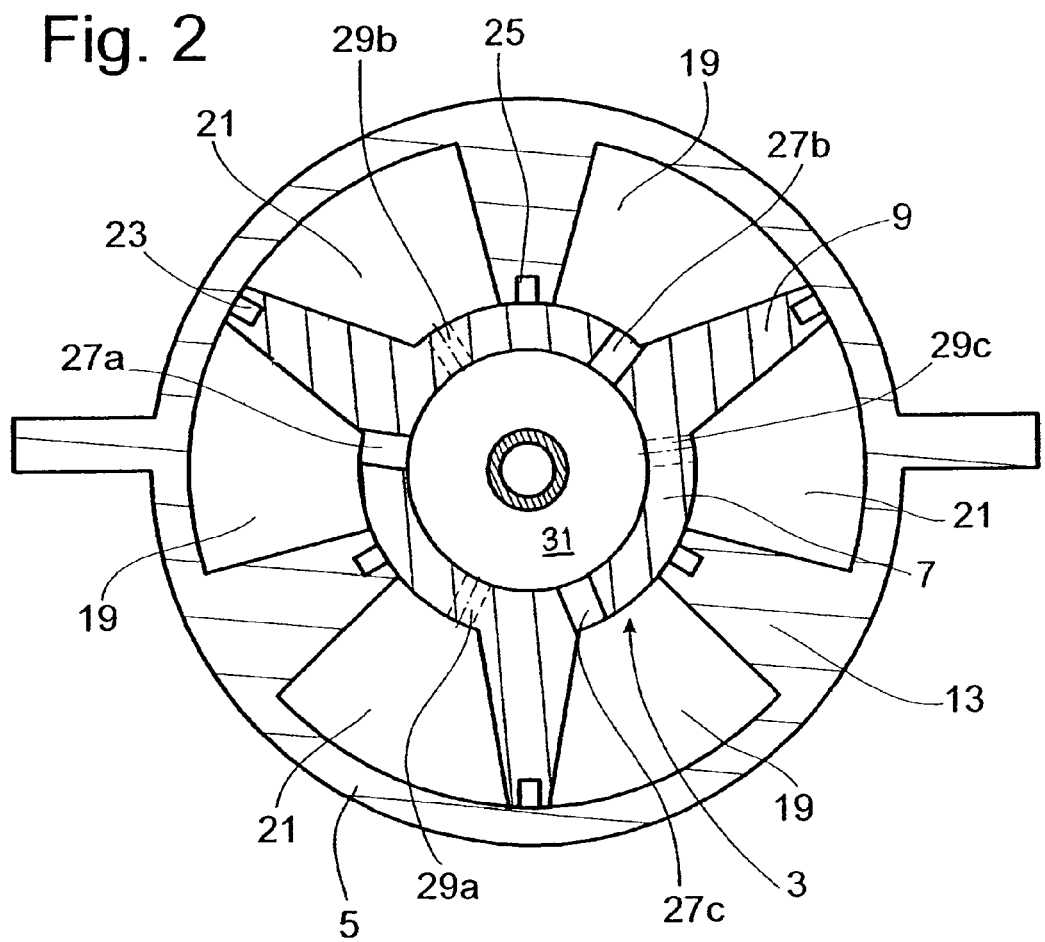

TORSIONAL VIBRATION DAMPER

BACKGROUND OF THE INVENTION

1. Field of the Invention

The invention pertains to a torsional vibration damper, especially for a motor vehicle body.

2. Description of the Related Art

U.S. Pat. No. 6,082,507, which represents the basic type of device in question, describes a torsional vibration damper comprising:

a vane-equipped stator and a vaned rotor, where the stator and the rotor form at least two working chambers filled with damping medium, which chambers change their volume in opposite directions during the oscillating movement; and at least one damping device, which is connected to at least one of the working chambers, where the working chamber connected to the damping device has at least one flow connection leading to the damping device, where the damping device has a collecting space, which is connected via the flow connections to each of the working chambers, the collecting space being divided in two, where each of the collecting spaces connects all of the working chambers of one rotational direction, the two individual collecting spaces being separated by a partition, in which the damping device is installed, where at least one of the collecting spaces is in working connection with a pre-pressurized compensating space.

In this type of vibration damper, the compensating space must be pre-pressurized in such a way that, for one rotational direction of the rotor, the maximum achievable damping pressure is lower than the pre-pressurization, because otherwise the separating piston would be pushed against the gas cushion in the compensating space. For this reason, a comparatively high level of pre-pressurization in the compensating space is chosen. This results in a high overall pressure level within the torsional vibration damper, as a result of which increased frictional forces occur between the rotor and the stator. It is already pointed out in U.S. Pat. No. 6,082,507 that the collecting space at the lower pressure level should be in working connection with the compensating space; nevertheless, the task still remains of lowering the level of the pre-pressurization in the compensating space below that present according to the state of the art.

SUMMARY OF THE INVENTION

This task is accomplished in accordance with the invention in that a throttle point is provided between the damping device and the compensating space.

The throttle point produces a pressure gradient between the collecting space and the compensating space, so that the pre-pressurization in the compensating space can be made lower than that according to the state of the art.

The throttle point can be designed in a variety of ways. The compensating space serves primarily to compensate for temperature-caused changes in the volume of the damping medium within the torsional vibration damper. The volumes which are present, and especially the flow velocities which are present, are comparatively low. For this reason, the throttle point tends to exert a stronger throttling effect at higher flow velocities. The flow velocities which occur during the operation of the damper are much higher than the volume flow rates caused by temperature. If the throttle point is provided with an appropriately small cross section, a backpressure will build up, so that practically no damping medium will pass over from the damping device to the compensating space.

In a further advantageous embodiment, the throttle point acts in a directionally dependent manner. During the operation of the damper, the damping medium heats up. When installed in a chassis, the torsional vibration damper is cooled by the wind created by the motion of the vehicle. Very strong and especially very fast cooling effects can occur in rainy or snowy weather. The cooling effect can therefore occur more rapidly than the heating effect produced by the operation of the damper. It is for this reason that the throttle point acts in a directionally dependent manner.

It is advantageous for a check valve, which is closed when the flow is arriving from the collecting space, to be connected in parallel with the throttle point.

According to an especially simple embodiment, the throttle point is formed by a porous component. A porous component consisting of sintered material has been found to be a very simple and low-cost solution. Alternatively, a throttle point can also be designed in the form of a channel cooperating with a cover disk, so that the size of the throttle cross section between the cover disk and the channel can be controlled very precisely.

As a further elaboration, the compensating space is located on the same center axis as the collecting space, and a second partition containing the throttle point extends between the compensating space and the damping device.

The damping device and the second partition are designed as ring-shaped pistons and together with a support rod form a single structural unit. This unit can be prefabricated independently of the overall torsional vibration damper. It is also possible for the ring-shaped piston for the damping device to be identical, as a component, to the second partition. The two components can be made to serve their different functions by providing the flow channels inside the ring-shaped pistons with the desired components.

The invention will be explained in greater detail below on the basis of the following description of the figures:

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 2 shows a cross section of a torsional vibration damper.

DETAILED DESCRIPTION OF THE PRESENTLY PREFERRED EMBODIMENTS

Figure 1A:
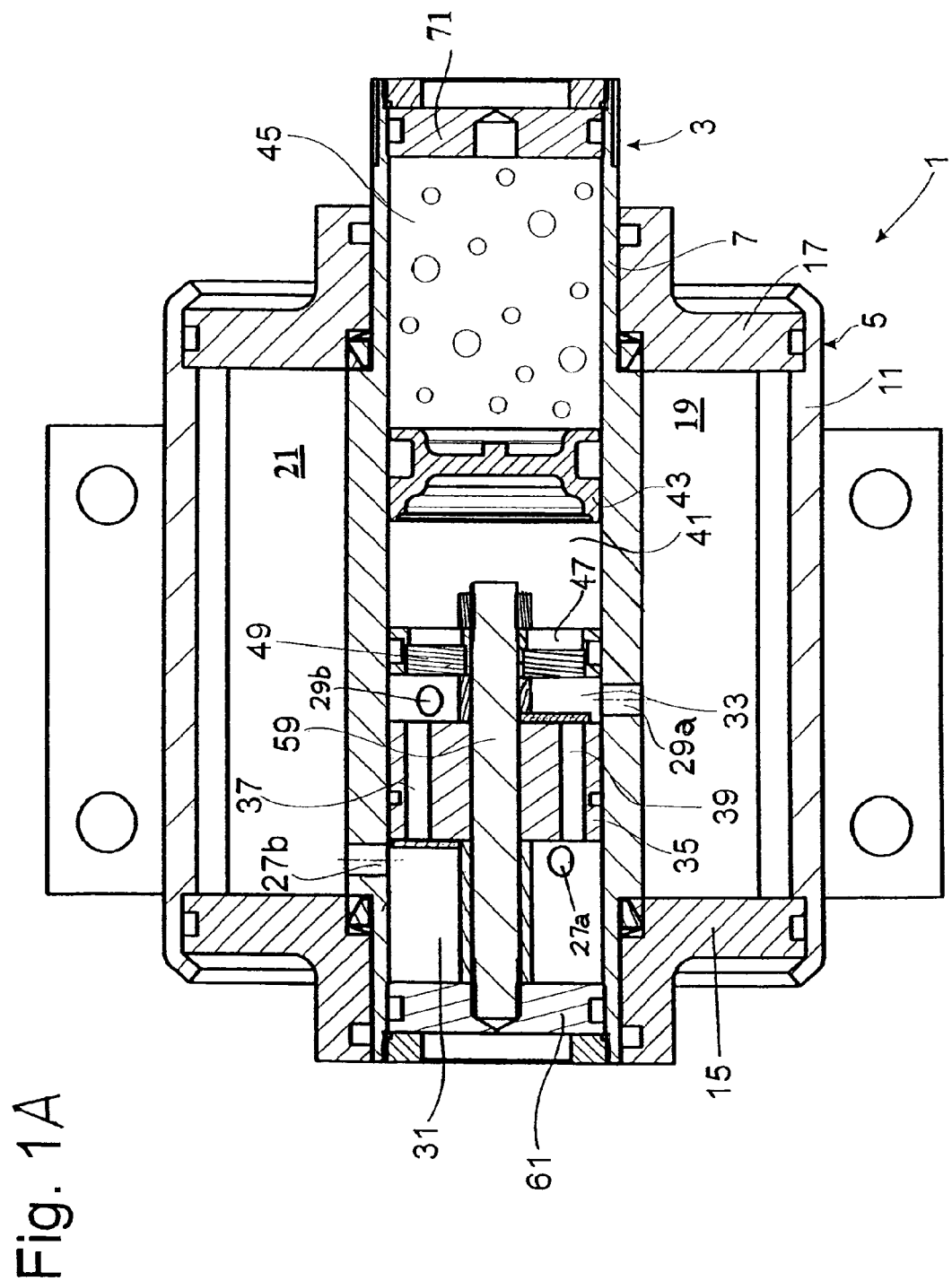
FIG. 1A shows a longitudinal section through a first variant of the torsional vibration damper.

Both FIGS. 1 and 2 illustrate the design of a torsional vibration damper 1. A rotor 3, which is supported so that it can oscillate with respect to a stator 5, has a tubular base body 7, which carries vanes 9, extending in the axial direction. The stator 5 carries ribs 13 on the inside wall of a cylinder 11, these ribs being parallel to the vanes. The base body 7 with its vanes 9, the cylinder 11 with its ribs 13, and the covers 15, 17 at the two ends of the stator form the working chambers 19, 21, where the working chambers with the same reference numbers change their volume synchronously during the oscillating movement of the rotor. The covers 15, 17 and the cylinder 11 can be joined to form a housing by simply flanging over the edges of the cylinder. Adjacent working chambers 19, 21 are separated hydraulically from each other by seals 23, 25.

Working chambers with the same reference numbers are connected in each case via radial channels 27a, b, c and 29a, b, c to collecting spaces 31, 33, respectively. A first stationary partition 35 is installed inside the tubular base body 7, between the two collecting spaces 31, 33. This partition is designed as a damping device with damping valves 37, 39, one for each of the two different directions of flow. The volume within the working chambers 19, 21 is pumped back and forth via the damping device. To compensate for temperature-caused changes in volume, a compensating space 41 is provided coaxially with the collecting spaces 31, 33 and in series with them along the common axis, inside the tubular base body. The compensating space 41 is completely filled with a damping medium and is separated by an axially movable separating piston 43 from a pre-pressurized gas space 45. The other end of the gas space is closed off by a cover 71. The gas space can be filled very easily through the open end of the tubular base body.

Figure 1B:
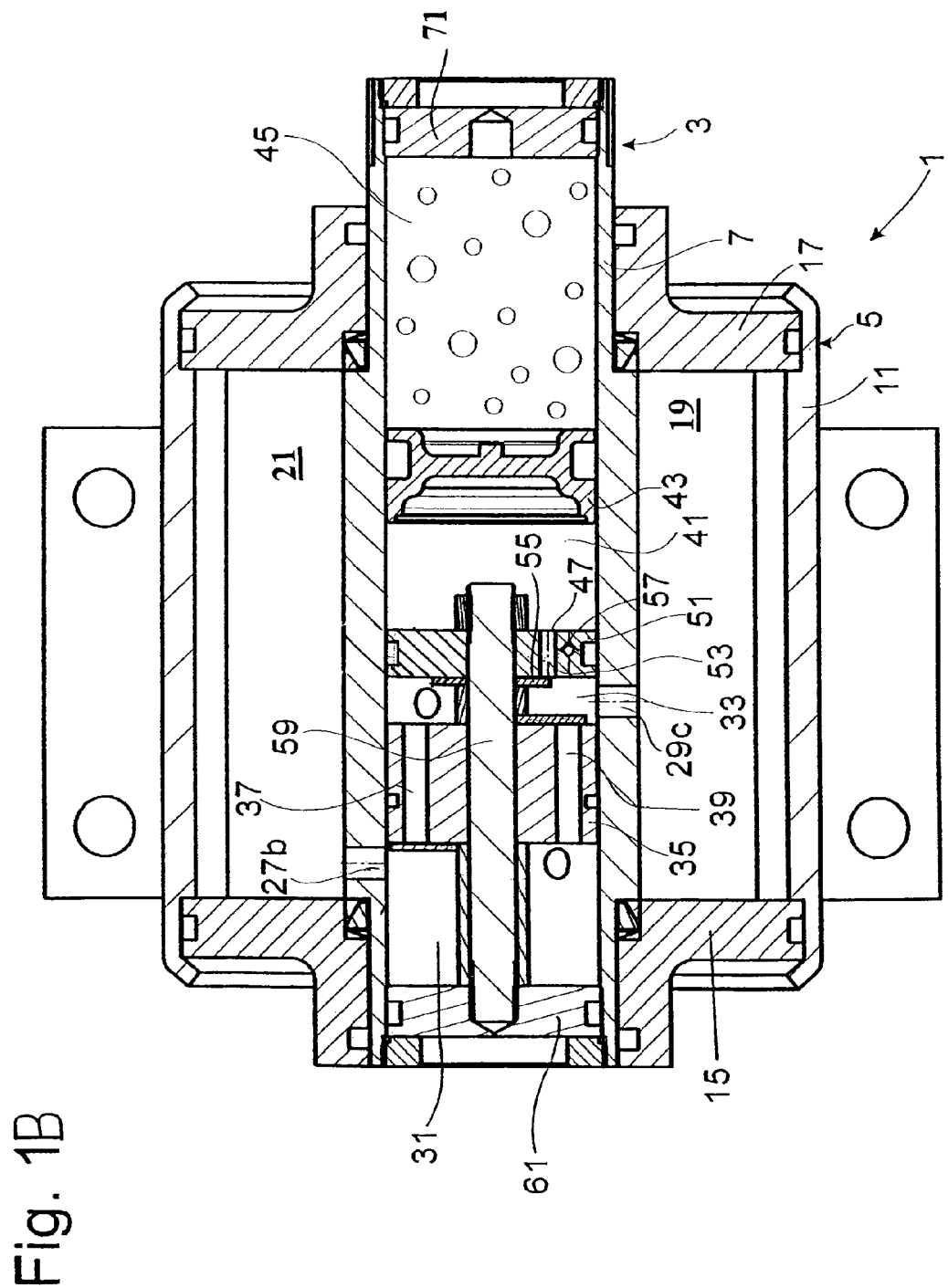
FIG. 1B shows a longitudinal section through a second variant of the torsional vibration damper.

A throttle 47 is provided between the damping valve 37 and the compensating space 41. FIG. 1 shows two design variants. First, as shown in FIG. 1A, a porous component 49 made of sintered material, for example, can be used. It is important for the throttle to exert a strong damping force at high flow velocities. Alternatively, as shown in FIG. 1B, it is also possible to use a second stationary partition 51, in which a throttle 47 is installed. A channel 53, which is at least partially covered by a disk 55, will be provided in this case. The throttle point could also be realized by stamping the side facing the disk 55 or by making a cutout in the disk.

It is also possible to connect a check valve 57 functionally in parallel with the throttle 47, so that the throttle acts in a directionally dependent manner.

The two partitions 35, 51 are designed as ring-shaped pistons, which, together with a support rod 59, form a prefabricatable unit. The support rod in turn is permanently connected to a second cover 61 on the rotor. The torsional vibration damper can be filled with a damping medium very easily through this cover.

When the rotor 3 rotates in the counterclockwise direction, as seen in FIG. 2, the volume of the working chambers 19 decreases. The damping medium thus displaced is forced through the radial channels 27a, b, c into the collecting space 31 and arrives at the damping valve 39 of the damping device 35. The damping valve 39 opens to a greater or lesser extent as a function of the pressure level, thus allowing damping medium to flow from the collecting space 31 into the collecting space 33 and via channels 29a, b, c into the working chambers 21, the volumes of which are increasing at the same time. The pressure of the damping medium in the collecting space 33 is also acting on the second partition 51 or on the porous component 49. The throttle 47, however, allows only a very small volume flow rate to pass through, so that there's a significant pressure gradient with respect to the compensating space 41, this gradient being determined in turn by the pre-pressurization of the gas space 45.

When the rotor rotates in the clockwise direction, the collecting space 33 containing damping medium is put under pressure. The second partition with the throttle 47 acts to absorb the pressure acting on the damping valve 37. As a result, the damping force which can be reached at the damping valve 37 no longer depends just on the pre-pressurization in the gas space 45 but rather on both the pressure gradient at the throttle 47 and the pre-pressurization in the gas space 45, the influence of the throttle being much stronger than that of the gas space.

When the torsional vibration damper cools down, damping medium can flow from the compensating space 41 into the collecting space 33 and thus compensate for the decrease in the volume of the damping medium. If the cooling occurs very rapidly, the check valve 57 will accelerate the return flow considerably, because it bridges the throttle point 47.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torsional vibration damper comprising:
   a stator having at least one radially extending vane;
   a rotor arranged concentrically to said stator, the rotor being rotatable about an axis and having at least one vane extending radially toward said stator and alternating with said at least one vane of said stator to form at least one first working chamber having a volume which decreases when said rotor rotates in one direction relative to said stator, and at least one second working chamber having a volume which decreases when the rotor rotates in an opposite direction relative to said stator;
   a first collecting space connected to said at least one first working chamber;
   a second collecting space connected to said at least one second working chamber;
   a first partition between the first and second collecting spaces, the partition having a damping device which permits flow between the collecting spaces; and
   a pre-pressurized compensating space in working connection with the second collecting space;
   a second partition between the second collecting space and the compensating space, the second partition having a throttle which permits flow communication between the second collecting space and the compensating space; and
   a support rod, the first and second partitions being fixed to the support rod,
   wherein the first collecting space, the second collecting space, and the pre-pressurized compensating space are arranged coaxially in series along the axis.

2. The torsional vibration damper of claim 1 wherein the throttle is configured to exert a stronger throttling effect at higher flow velocities of a damping medium through the throttle than at lower flow velocities of the damping medium through the throttle.

3. The torsional vibration damper of claim 1 wherein the throttle is configured to permit higher flow in one direction than in an opposite direction.

4. The torsional vibration damper of claim 1 further comprising a check valve in parallel to the throttle, the check valve being closed to flow from the second collecting space to the compensating space.

5. The torsional vibration damper of claim 1 wherein the throttle comprises a porous element.

6. The torsional vibration damper of claim 5 wherein the porous element consists of sintered material.

7. The torsional vibration damper of claim 1 wherein the stator comprises a cylinder and the rotor comprises a tubular base body located concentrically inside the cylinder, said first partition, said second partition, and said compensating space being located inside said tubular base body.

8. The torsional vibration damper of claim 1 further comprising a gas space arranged coaxially in series with said compensating space, said gas space being separated from said compensating space by a piston.

9. The torsional vibration damper of claim 8 wherein the working chambers, the collecting spaces, and the compensating space are filled with a damping medium.

* * * * *